(12) United States Patent
Okudaira

(10) Patent No.: US 7,916,211 B2
(45) Date of Patent: Mar. 29, 2011

(54) IMAGING APPARATUS AND LOCK MECHANISM

(75) Inventor: Tetsuya Okudaira, Shizuoka (JP)

(73) Assignee: Sony Corporation (JP)

( * ) Notice: Subject to any disclaimer, the term of this patent is extended or adjusted under 35 U.S.C. 154(b) by 762 days.

(21) Appl. No.: 11/893,460

(22) Filed: Aug. 14, 2007

(65) Prior Publication Data

US 2008/0049135 A1 Feb. 28, 2008

(30) Foreign Application Priority Data

Aug. 24, 2006 (JP) ................................ P2006-227872

(51) Int. Cl.
*H04N 5/225* (2006.01)
*G03B 17/00* (2006.01)

(52) U.S. Cl. ..................... 348/374; 348/333.06; 396/424

(58) Field of Classification Search ............. 348/333.06, 348/333.07, 373–376; 396/374, 422, 424, 396/428; 16/338, 342, 343
See application file for complete search history.

(56) References Cited

U.S. PATENT DOCUMENTS

| | | | | |
|---|---|---|---|---|
| 4,375,653 A | * | 3/1983 | Staley | 348/373 |
| 4,591,250 A | * | 5/1986 | Woodruff | 396/50 |
| 4,605,296 A | * | 8/1986 | Munnion | 396/383 |
| 4,682,240 A | * | 7/1987 | Bachmann | 348/333.06 |
| 4,926,262 A | * | 5/1990 | Rowens, Sr. | 348/375 |
| 5,767,906 A | | 6/1998 | Toyofuku et al. | |
| 5,801,774 A | * | 9/1998 | Seo | 348/333.06 |
| 5,913,351 A | * | 6/1999 | Miura | 16/340 |
| 5,982,429 A | * | 11/1999 | Kamamoto et al. | 348/333.06 |
| 6,778,775 B1 | * | 8/2004 | Auffret | 396/374 |
| 7,017,235 B2 | * | 3/2006 | Lu et al. | 16/367 |
| 7,735,198 B2 | * | 6/2010 | Petermann et al. | 16/342 |
| 2004/0100576 A1 | * | 5/2004 | Lu et al. | 348/375 |
| 2005/0174480 A1 | * | 8/2005 | Nakamura | 348/376 |

FOREIGN PATENT DOCUMENTS

| | | |
|---|---|---|
| JP | 06-078187 A | 3/1994 |
| JP | 08-286117 A | 11/1996 |

* cited by examiner

*Primary Examiner* — Timothy J Henn
(74) *Attorney, Agent, or Firm* — Lerner, David, Littenberg, Krumholz & Mentlik, LLP

(57) ABSTRACT

An imaging apparatus is disclosed. The image apparatus has: a camera body; a viewfinder unit including a frame; a revolving mechanism for revolving the frame; a frictional mechanism including a detachable plate and giving frictional resistance to the frame and maintaining rotation of the frame; and a lock mechanism for locking and unlocking rotation of the frame. The lock mechanism includes a cylindrical member and a manipulating member for locking. When the manipulating member is rotated in one direction, the manipulating member moves the cylindrical member toward the detachable plate. The part of the frame around a pivot-receiving hole is held between the front end of a barrel and the detachable plate. When rotated in the other direction, the manipulating member permits the cylindrical member to move away from the detachable plate.

17 Claims, 8 Drawing Sheets

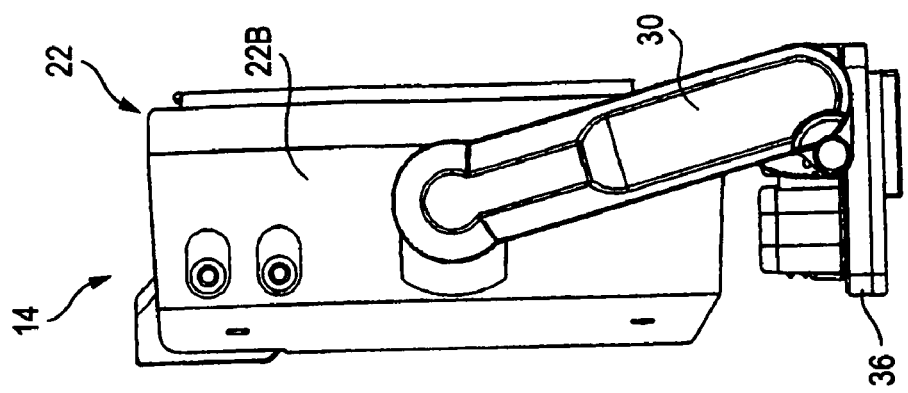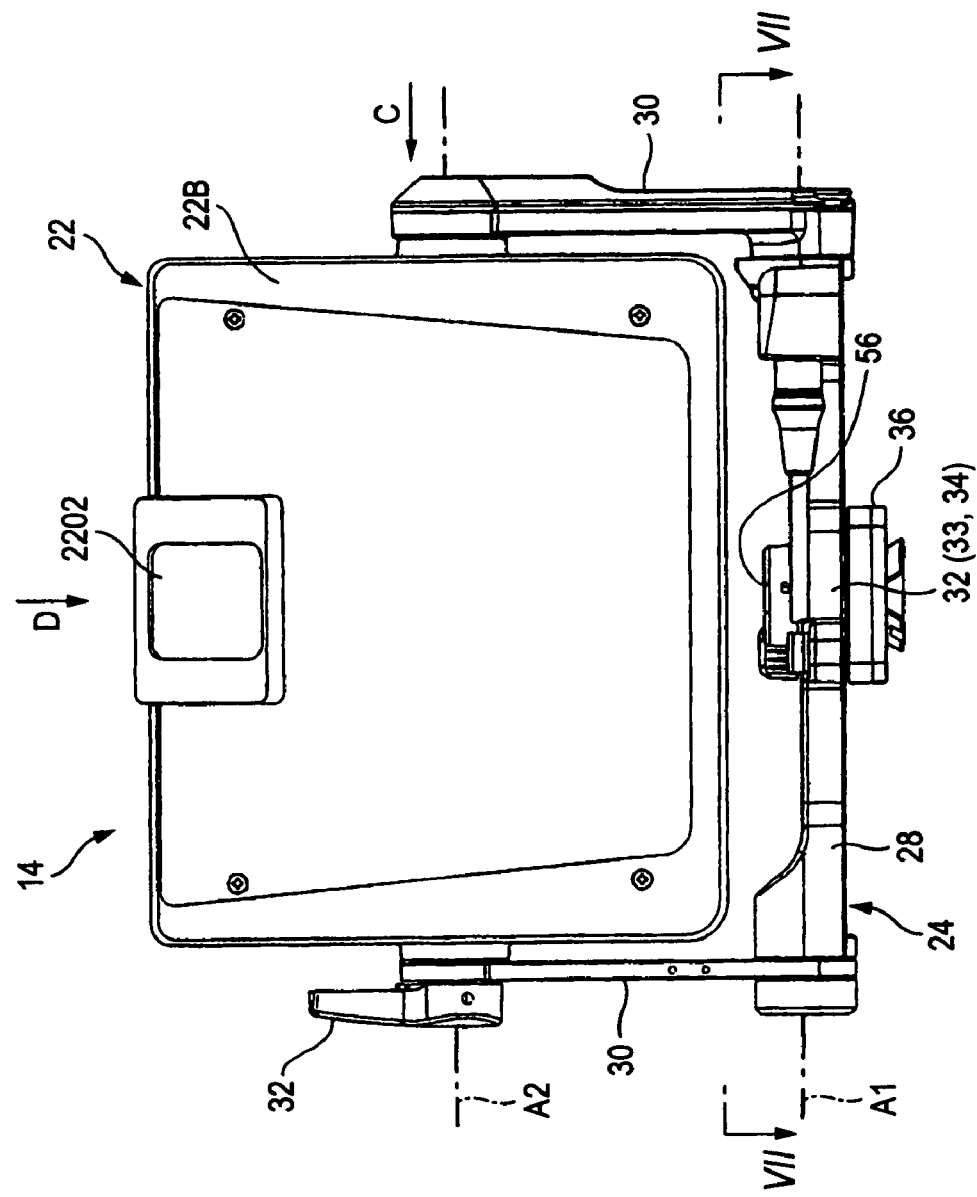

IMAGING APPARATUS AND LOCK MECHANISM

CROSS-REFERENCE TO RELATED APPLICATION

The present application claims priority from Japanese Patent Application No. JP 2006-227872, filed in the Japanese Patent Office on Aug. 24, 2006, the entire content of which is incorporated herein by reference.

BACKGROUND OF THE INVENTION

1. Field of the Invention

The present invention relates to an imaging apparatus and a lock mechanism.

2. Description of the Related Art

Some of imaging apparatus used in business applications (i.e., used, for example, in broadcast stations) have a camera body for photographing a subject and creating a video signal and a viewfinder unit mounted to the camera body and acting to display the image based on the video signal (see JP-A-6-78187 and JP-A-8-286117 (Patent References 1 and 2)).

Such an imaging apparatus is often equipped with a revolving mechanism for holding a viewfinder unit such that it can rotate, for example, about a vertical axis to permit the display screen of the viewfinder unit to be observed easily depending on the position and posture of the photographer who is standing and on the circumstances of the subject.

Heretofore, such a revolving mechanism has held the viewfinder unit at a given frictional force to prevent the viewfinder unit from rotating idly.

SUMMARY OF THE INVENTION

Where such an imaging apparatus is attached to a tripod and photography is performed, if the imaging apparatus is rotated quickly (panned) about the vertical axis in response to motion of the subject, a force exceeding the aforementioned frictional force acts on the revolving mechanism from the viewfinder unit due to inertia. As a result, the viewfinder unit may rotate idly. In such a case, the photographer has to manually return the viewfinder unit to its original position in a laborious manner during photography. Hence, there is the problem that the apparatus suffers from inconvenience in use.

In view of these circumstances, it is desirable to provide imaging apparatus and lock mechanism which are advantageous in enhancing convenience in use.

An imaging apparatus according to one embodiment of the present invention has: a camera body including a case, an imaging device accommodated in the case and acting to image a subject, and a signal-processing portion accommodated in the case and acting to create a video signal based on an imaging signal created by the imaging device; a viewfinder unit including a display portion for displaying an image based on the video signal and a frame supporting the display portion; a revolving mechanism for revolving the frame, the revolving mechanism including a detachable plate detachably connected to a detachable portion of the case, a pivot protruding from the detachable plate, and a shaft-receiving hole which is formed in the frame and into which the pivot (pivotal shaft) is rotatably inserted; a frictional mechanism for giving frictional resistance to the frame and maintaining rotation of the frame; and a lock mechanism for locking and unlocking rotation of the frame. The lock mechanism includes a cylindrical member coupled to the pivot so as to be movable axially of the pivot and having a barrel part which covers the pivot over a part of the frame that is around the shaft-receiving hole, and a manipulating member for locking, the manipulating member being rotatably coupled to the pivot. When the manipulating member is rotated in one direction, the manipulating member moves the cylindrical member toward the detachable plate. The part of the frame around the shaft-receiving hole is held between the front end of the barrel part and the detachable plate. When the manipulating member is rotated in the other direction, the manipulating member permits the cylindrical member to move away from the detachable plate.

Another embodiment of the present invention provides a lock mechanism mounted in a revolving mechanism for revolving a frame, the revolving mechanism having a detachable plate, a pivot protruding from the detachable plate, and a shaft-receiving hole formed in the frame. The pivot is rotatably inserted in the shaft-receiving hole. The lock mechanism locks and unlocks rotation of the frame. The lock mechanism includes a cylindrical member coupled to the pivot so as to be movable axially of the pivot and having a barrel part that covers the pivot over a part of the frame that is around the shaft-receiving hole, and a manipulating member for locking, the manipulating member being rotatably coupled to the pivot. When the manipulating member is rotated in one direction, the manipulating member moves the cylindrical member toward the detachable plate. The part of the frame around the shaft-receiving hole is held between the front end of the barrel part and the detachable plate. When the manipulating member is rotated in the other direction, the manipulating member permits the cylindrical member to move away from the detachable plate.

According to embodiments of the present invention, in a case where rotation of the frame is locked by the lock mechanism, inadvertent rotation of the viewfinder unit is prevented. In cases where the imaging apparatus might be suddenly panned, it is advantageous in enhancing convenience in use.

Where rotation of the frame is unlocked by the lock mechanism, the frame can be easily rotated by moving the viewfinder unit manually. The viewfinder unit can be brought to a desired rotational position.

BRIEF DESCRIPTION OF THE DRAWINGS

FIG. 5A is a front elevation of the viewfinder unit shown in FIG. 4.

FIG. 5B is a view taken in the direction indicated by the arrow C of FIG. 5A.

DESCRIPTION OF THE PREFERRED EMBODIMENTS

Embodiments of the present invention are next described with reference to the drawings.

Figure 1:
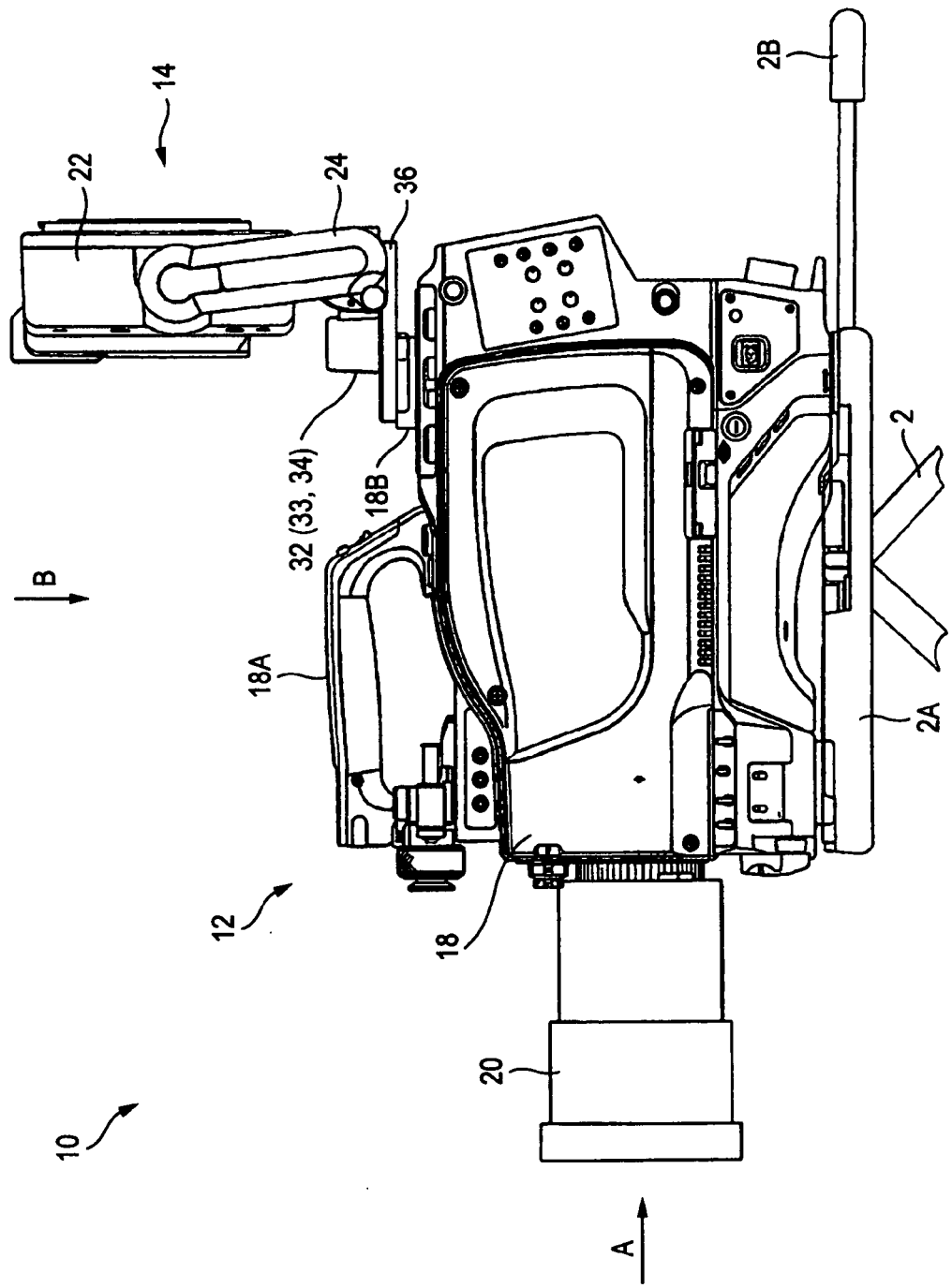
FIG. 1 is a side elevation of an imaging apparatus 10.
Figure 2:
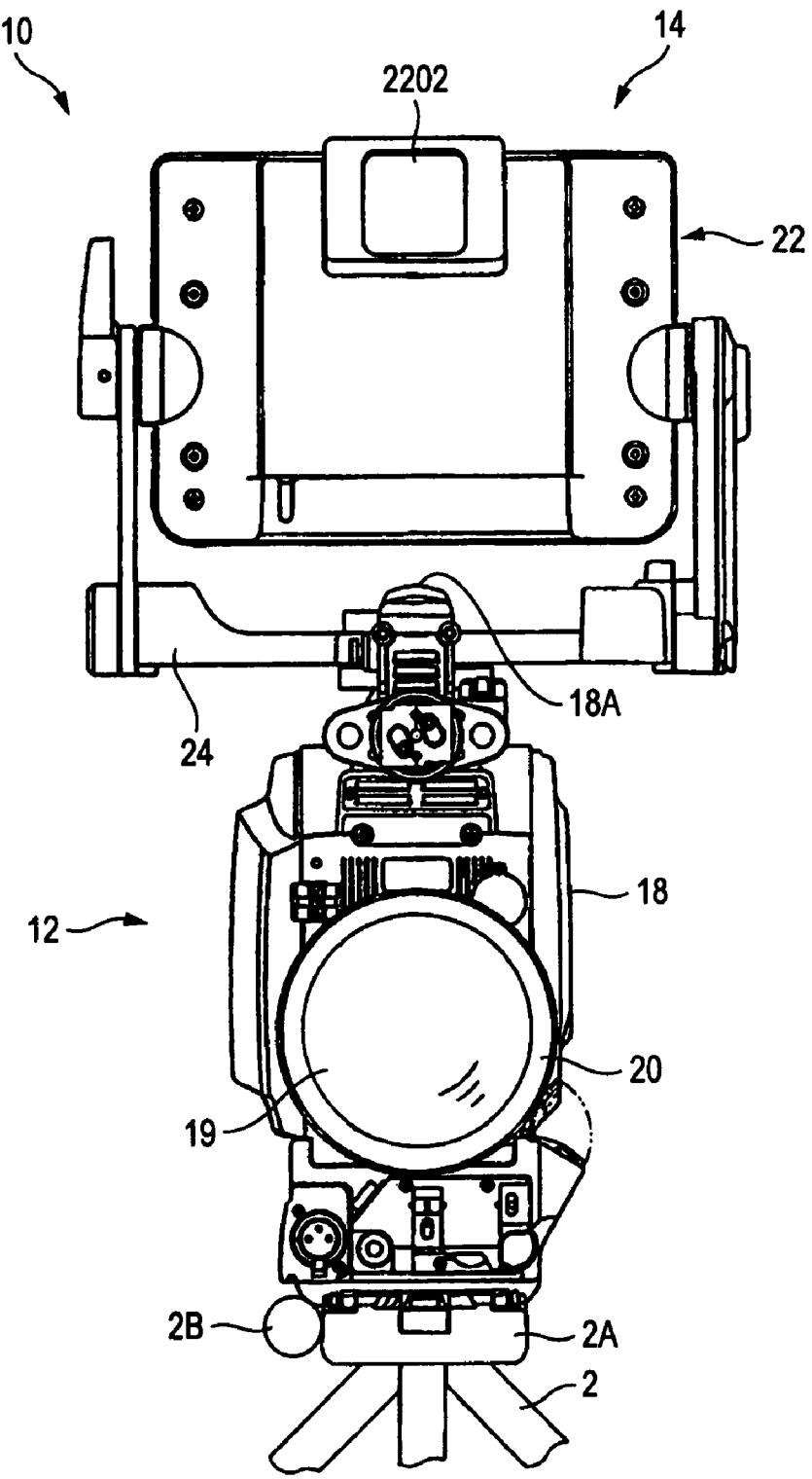
FIG. 2 is a view taken in the direction indicated by the arrow A of FIG. 1.
Figure 3:
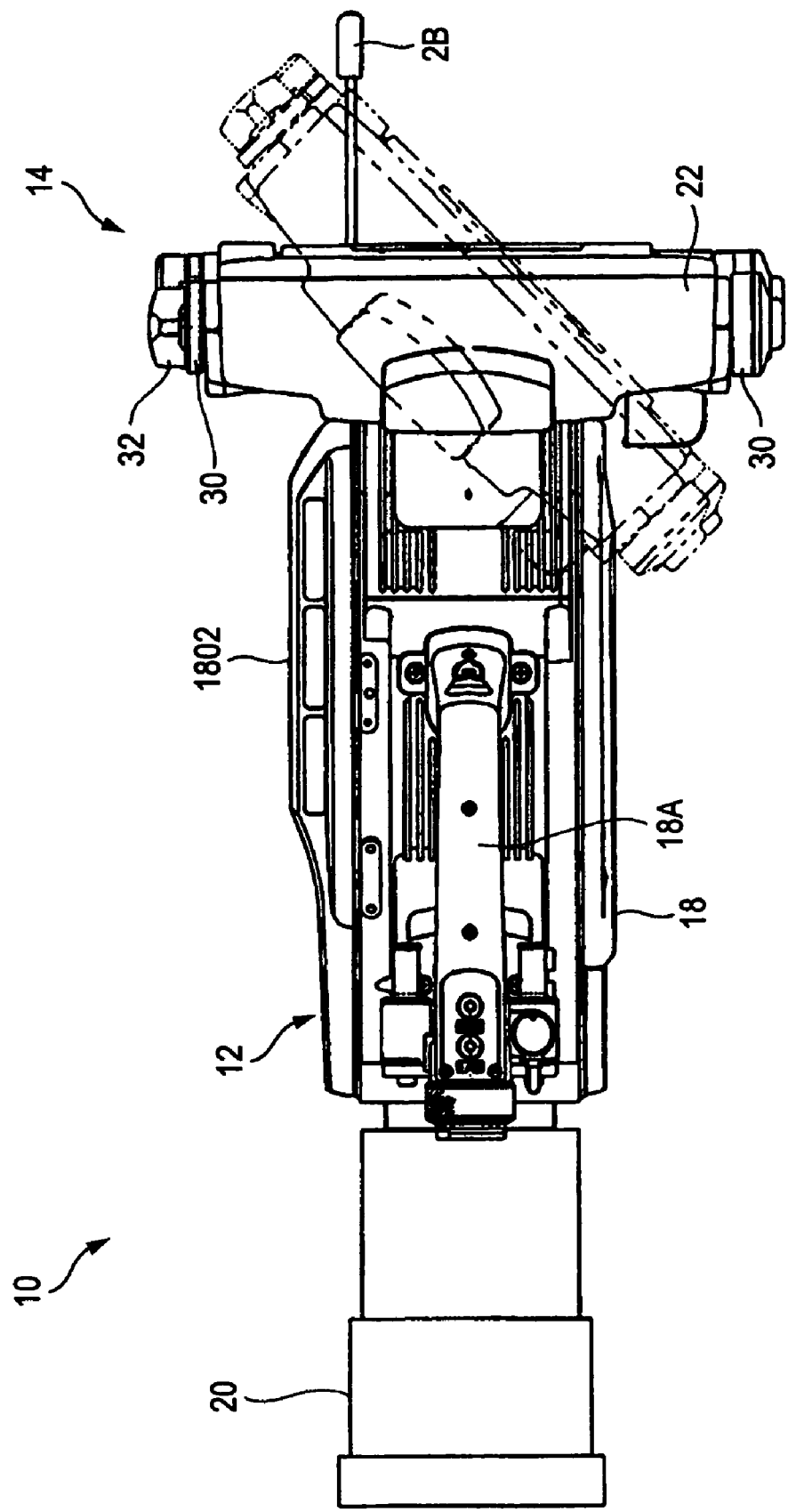
FIG. 3 is a view taken in the direction indicated by the arrow B of FIG. 1.

FIG. 1 is a side elevation of an imaging apparatus 10. FIG. 2 is a view taken in the direction indicated by the arrow A of FIG. 1. FIG. 3 is a view taken in the direction indicated by the arrow B of FIG. 1.

Figure 4:
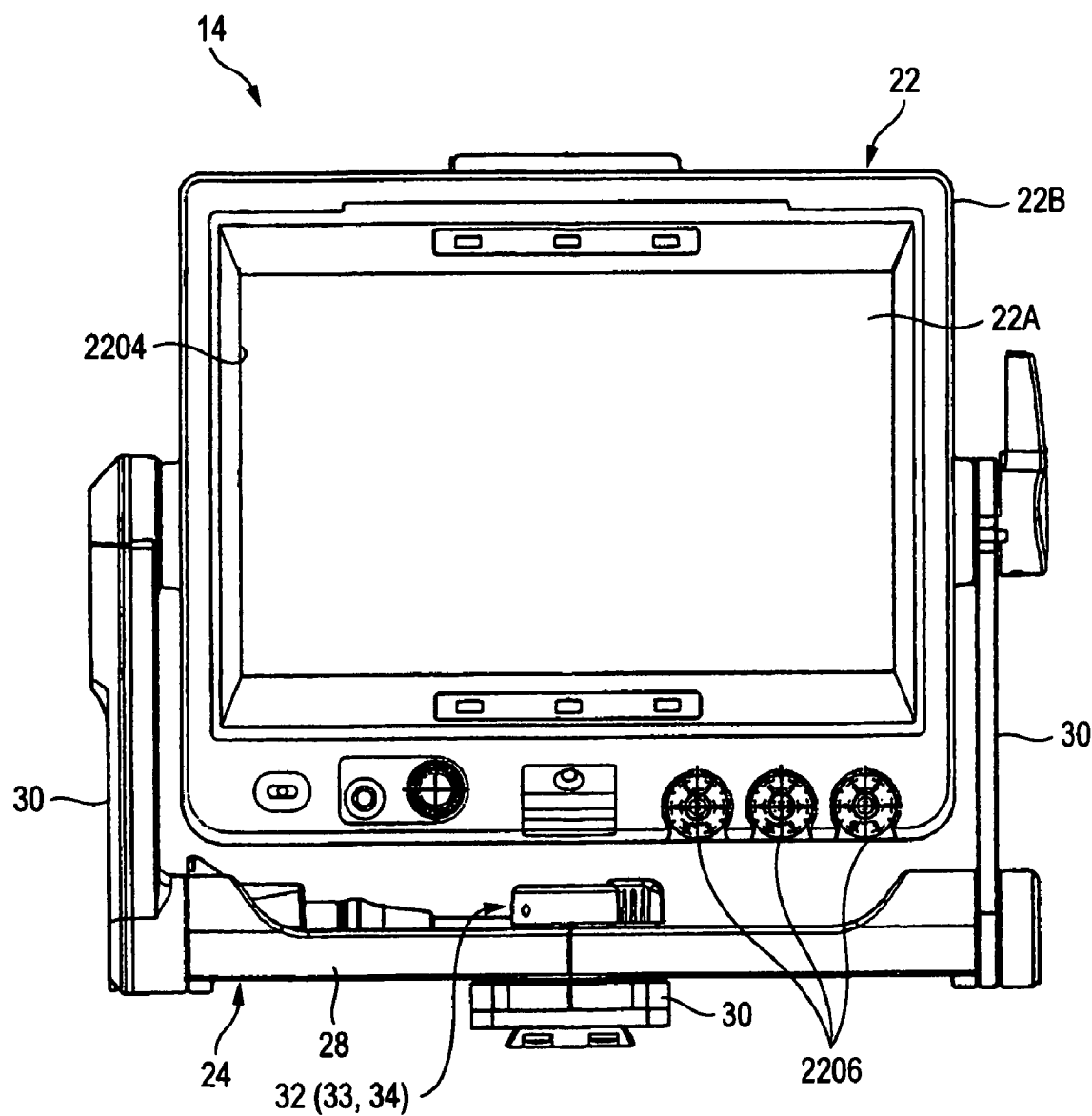
FIG. 4 is a rear view of the viewfinder unit shown in FIG. 1.

FIG. 4 is a rear view of the viewfinder unit shown in FIG. 1. FIG. 5A is a front elevation of the viewfinder unit. FIG. 5B is a view taken in the direction indicated by the arrow C of FIG. 5A.

Figure 6:
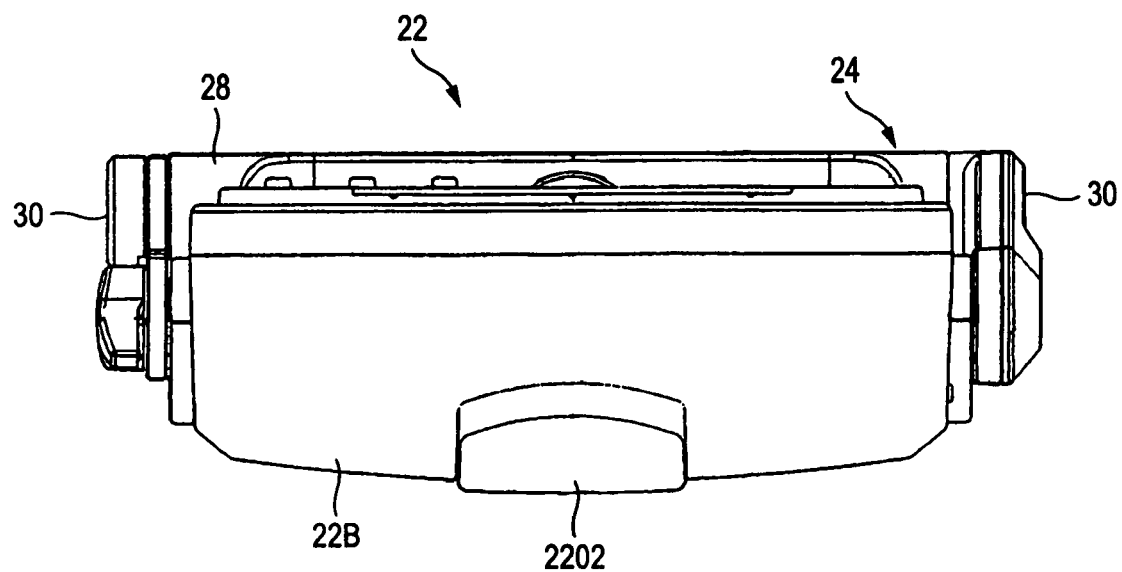
FIG. 6 is a view taken in the direction indicated by the arrow D of FIG. 5A.
Figure 7:
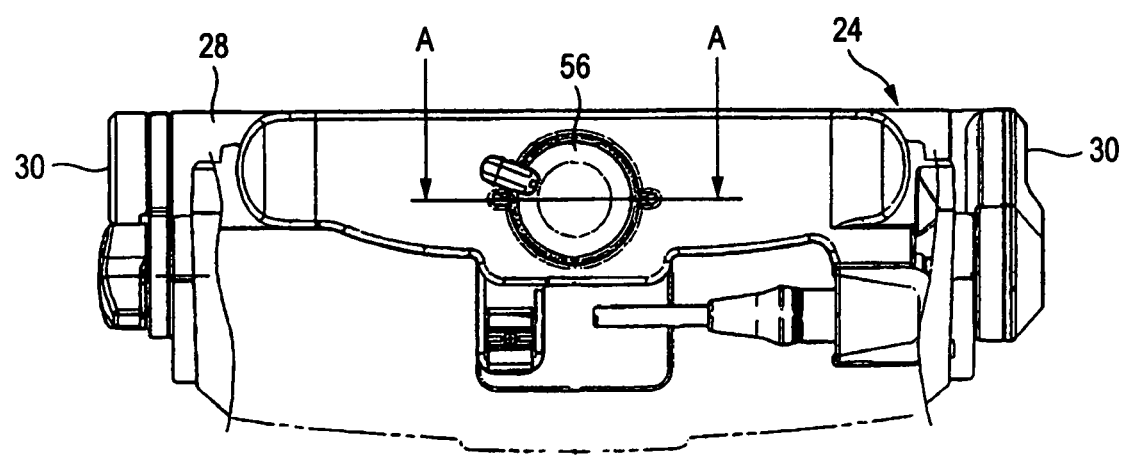
FIG. 7 is a view taken along line E-E of FIG. 5A.

FIG. 6 is a view taken in the direction indicated by the arrow D of FIG. 5A. FIG. 7 is a view taken along line E-E of FIG. 5A.

Figure 8:
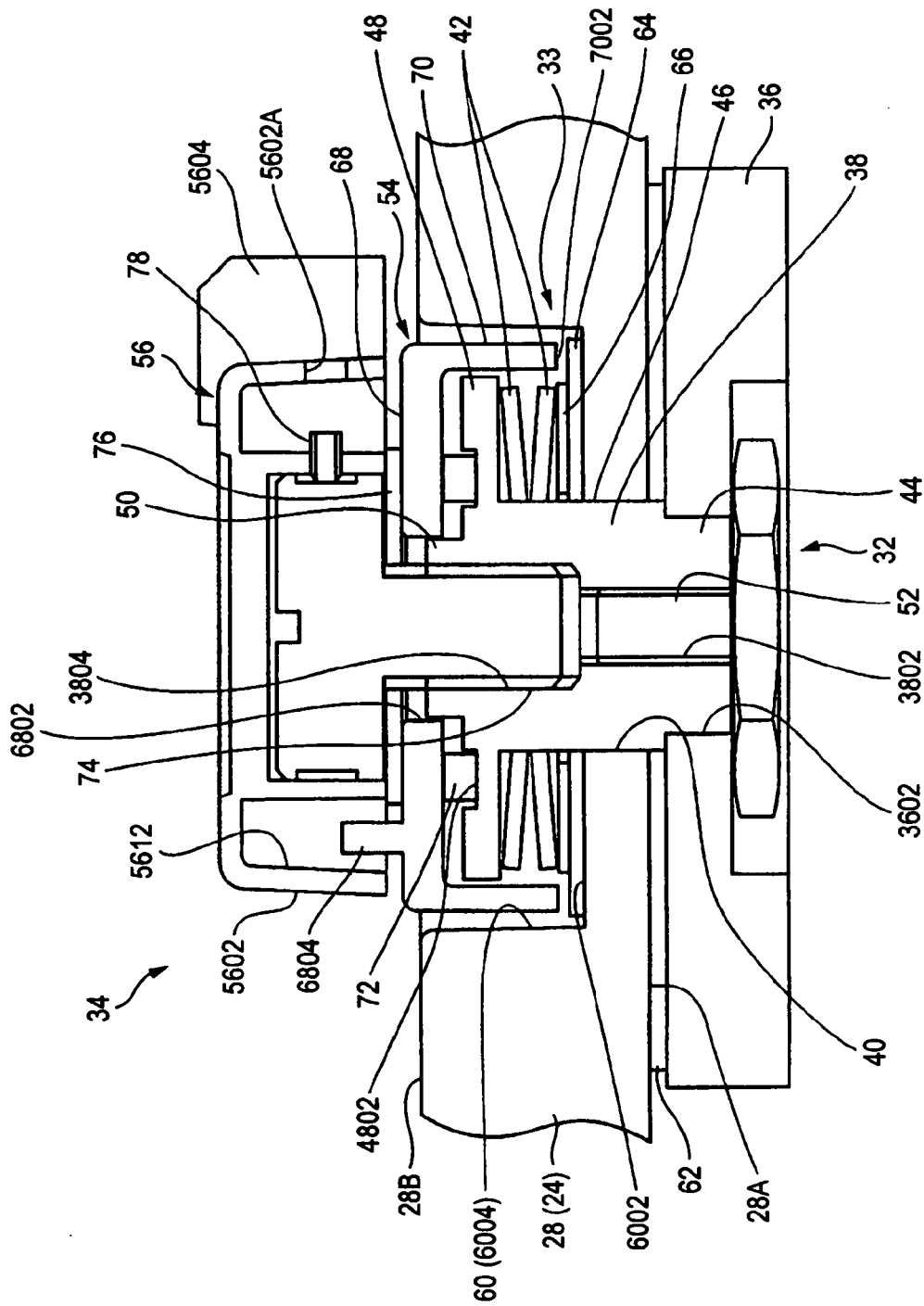
FIG. 8 is a cross-sectional view of a revolving mechanism 32, a frictional mechanism 33, and a lock mechanism 34 under the condition where rotation of a frame 24 is unlocked.

FIG. 8 is a cross-sectional view of a revolving mechanism 32, a frictional mechanism 33, and a lock mechanism 34 under the condition where rotation of a frame 24 is unlocked.

Figure 9:
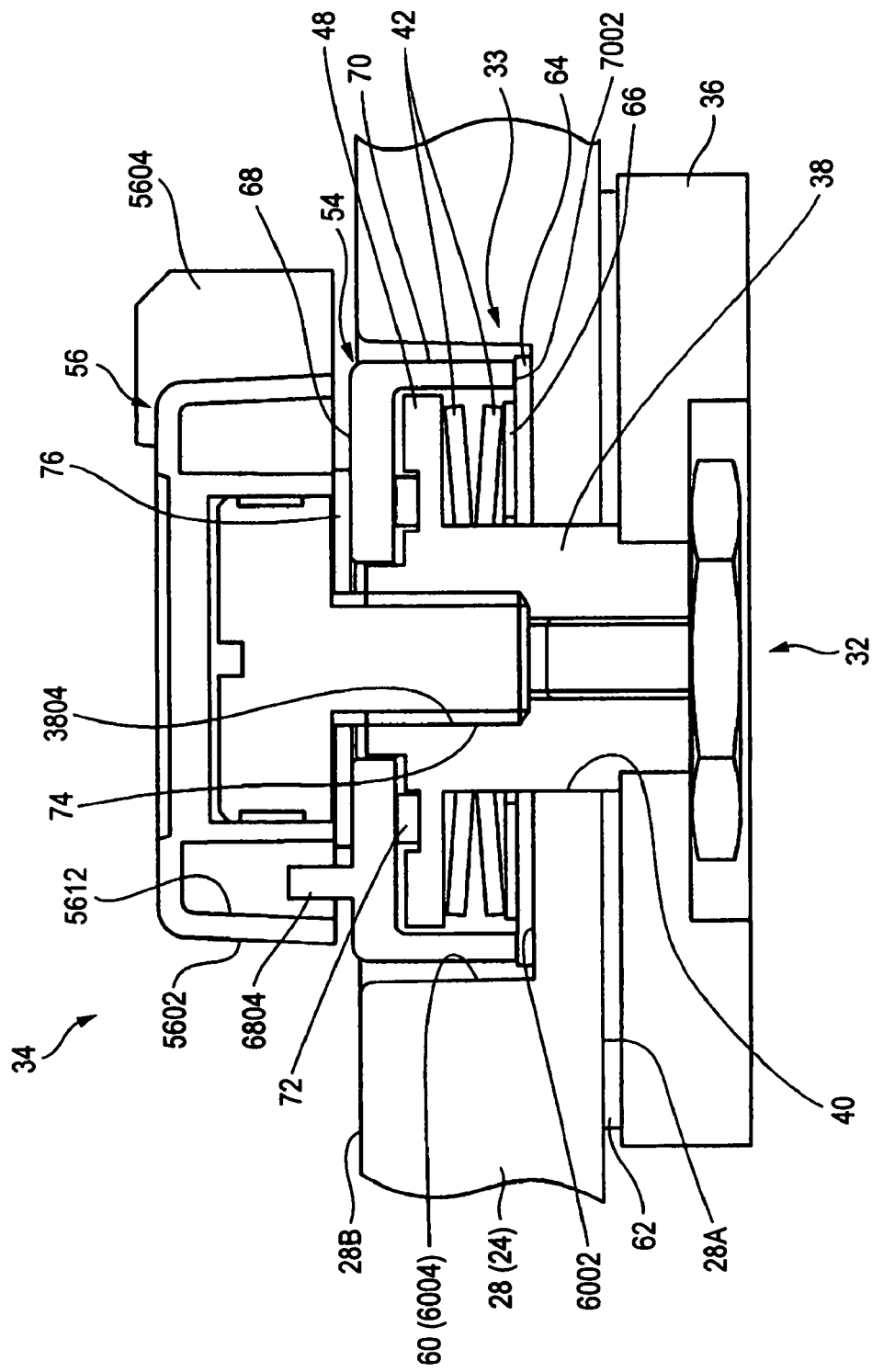
FIG. 9 is a cross-sectional view similar to FIG. 8, but showing the condition where rotation of the frame 24 is locked.

FIG. 9 is a cross-sectional view similar to FIG. 8, but showing the condition where rotation of the frame 24 is locked.

As shown in FIGS. 1-3, the imaging apparatus 10 has a camera body 12, a viewfinder unit 14, the revolving mechanism 32, the frictional mechanism 33, and the lock mechanism 34.

The camera body 12 includes a case 18, an imaging device (not shown) accommodated in the case 18 and imaging a subject, and a signal-processing portion (not shown) accommodated in the case 18 and creating a video signal based on an imaging signal created by the imaging device.

In the present embodiment, the case 18 assumes a box-like shape having a width in the left-and-right direction, a height in the up-and-down direction, and a length in the forward-and-rearward direction. The height is greater in dimension than the width. The length is greater in dimension than the height.

The front side of the imaging apparatus 10 referred to herein is the side facing the subject. The rear side is the side facing away from the subject, i.e., the side facing the photographer. Left and right of the imaging apparatus 10 are sides referred to under the condition where the photographer sees the front side from the rear side.

As shown in FIG. 2, a lens barrel 20 for holding a photography optical system 19 for guiding an image of the subject to the imaging device is mounted in the front surface of the case 18.

As shown in FIG. 3, a recording medium-mounting portion 1802 is mounted in the left side surface of the case 18. A recording medium such as a magnetic tape cassette for recording the aforementioned video signal, audio signal, and so on is inserted into and removed from the medium-mounting portion 1802.

As shown in FIG. 1, the case 18 has a lower portion detachably mounted to the pan head 2A of a tripod 2. The imaging apparatus 10 can be rotated (i.e., panned) together with the pan head 2A about the vertical axis by manipulating a handle 2B connected to the pan head 2A.

A grip 18A for transportation is mounted in a location on the top surface of the case 18 that is close to the front side. A mounting portion 18B for detachably mounting the viewfinder unit 14 is mounted in a location on the top surface of the case 18 that is close to the rear side.

As shown in FIGS. 1 and 4-7, the viewfinder unit 14 includes a display portion 22 and the frame 24.

The display portion 22 has a display unit 22A in the form of a rectangular plate for displaying an image by being supplied with the video signal from the camera body 12 and a display case 22B similarly in the form of a rectangular plate. The case 22B accommodates the display unit 22A. As an example, a liquid crystal display can be used as the display unit 22A.

As shown in FIG. 5A, a tally lamp 2202 that is lit up to indicate "during photography" is mounted on one surface (front surface) of the display case 22B in the direction of thickness. As shown in FIG. 4, an opening 2204 permitting the display screen of the display unit 22A to face rearward and plural manipulating members 2206 arranged along the lower side of the opening 2204 are mounted in the other surface (rear surface) of the display case 22B in the direction of thickness.

As shown in FIGS. 5A and 5B, the frame 24 has a base portion 28 and two arms 30 mounted to the opposite ends, respectively, of the base portion 28.

The base portion 28 is downwardly spaced from the lower side of the display case 22B and extends along this lower side.

One end of each of the two arms 30 is connected to a longitudinal end of the base portion 28 so as to be swingable about a first axis A1 extending in a horizontal direction.

Any of various known structures including a pivot, a pivot bearing supporting the pivot, and a friction-producing mechanism can be adopted as a structure for interconnecting one end of each of the two arms 30 and the end of the base portion 28.

In the present embodiment, the base portion 28 is provided with plural holes spaced from each other in the direction of the first axis A1. A pin mounted on one arm 30 is engaged in any one of the holes. Thus, the rotational angle of the arm 30 relative to the base portion 28 is selectively determined.

The other ends of the two arms 30 are connected to the longitudinal centers of the left and right sides of the display case 22B so as to be swingable about a second axis A2 extending parallel to the first axis A1.

Any of various known structures including a pivot, a pivot bearing supporting the pivot, and a friction-producing mechanism can be adopted as a structure for interconnecting the other end of each of the two arms 30 and the left or right side of the display case 22B.

In the present embodiment, the rotational angle of the display case 22B with respect to the arm 30 can be adjusted steplessly. A lock mechanism (not shown) is mounted which hinders or permits rotation of the pivot relative to the pivot bearing. The lock mechanism has a manipulation lever 32. The rotational angle of the display case 22B relative to the arms 30 can be held to any arbitrary position by manipulatively swinging the manipulation lever 32. This lock mechanism can be any of various known lock mechanisms.

Accordingly, the angles of oscillation of the display portion 22 about the first axis A1 and second axis A2 can be adjusted. Swinging the display portion 22 about the first axis A1 is herein referred to as lifting. Swinging the display portion 22 about the second axis A2 is herein referred to as tilting.

As shown in FIG. 8, the revolving mechanism 32 includes a detachable plate 36, a pivot (pivotal shaft) 38, and shaft-receiving hole 40. The frictional mechanism (friction-generating mechanism) 33 includes biasing members 42. The lock mechanism 34 includes a cylindrical member 54 and a manipulating member 56 for locking.

As shown in FIGS. 4 and 5, the detachable plate 36 is mounted in the center of a lower portion of the base portion 28. The detachable plate 36 is detachably connected to the mounting portion 18B of the case 18. Any of various known mounting mechanisms can be adopted as a mechanism for detachably mounting the detachable plate 36 to the mounting portion 18B.

As shown in FIG. 8, the pivot 38 protrudes from the detachable plate 36.

The pivot 38 has a lower-end shaft portion 44, a cylindrical portion 46, a flange 48, and an upper-end shaft portion 50.

After the lower-end shaft portion 44 and upper-end shaft portion 50 are shaped cylindrically, their opposite planar surfaces are formed. The cross section of each of the lower-end shaft portion 44 and upper-end shaft portion 50 is formed in a so-called double D cut-out.

A first female thread 3802 is formed from a side of the lower-end shaft portion 44 and a second female thread 3804 is formed from a side of the upper-end shaft portion 50 along the axis of the pivot 38.

The pivot 38 is mounted to the detachable plate 36 by non-rotatably inserting the lower-end shaft portion 44 into a fitting hole 3602 formed in the detachable plate 36 such that a male thread 52 is brought into threaded engagement with the first female thread 3802 and holding the portion of the detachable plate 36 between the end surface of the cylindrical portion 46 and the head of the male thread 52.

The base portion 28 (frame 24) is provided with the shaft-receiving hole 40. The pivot (pivotal shaft) 38 has the cylindrical portion 46 rotatably inserted in the shaft-receiving hole 40.

The base portion 28 (frame 24) has a first surface 28A placed opposite to the detachable plate 36 and a second surface 28B facing away from the first surface 28A. An open recessed portion 60 is formed in the second surface 28B about the shaft-receiving hole 40. The recessed portion 60 has a bottom surface 6002 and an inner surface 6004 raised from the bottom surface 6002 in the form of an annular plate.

The frictional mechanism 33 gives appropriate frictional resistance to the frame 24 on the detachable plate 36 to maintain rotation of the frame 24 (viewfinder unit 14). The frame 24 is prevented from rotating idly. The frame 24 (viewfinder unit 14) is maintained in desired state of rotation (rotational position) made by the user.

The frictional mechanism 33 includes the biasing members 42, which are mounted between the flange 48 and the bottom surface 6002. The flange 48 is at the front end of the pivot 38 protruding from the shaft-receiving hole 40. The bottom surface 6002 is a part of the frame 24 located around the shaft-receiving hole 40. The biasing members 42 bias the bottom surface 6002 into abutment against the detachable plate 36.

In the present embodiment, the biasing members 42 are made up of plural disc springs. The disc springs and flange 48 are located within the recessed portion 60.

Furthermore, in the present embodiment, a spacer 62 is interposed between the first surface 28A and the detachable plate 36. The spacer 62 is made of a material having a low coefficient of friction. One example of this material is POM (polyacetal). Use of this spacer 62 reduces the frictional resistance between the frame 24 and the detachable plate 36 to thereby smoothen and stabilize rotary motion of the frame 24.

In addition, in the present embodiment, a washer 64 is mounted over the bottom surface 6002 of the recessed portion 60. A second washer 66 having an outside diameter smaller than that of the first washer 64 is mounted on the first washer 64. The first washer 64 disposed over the bottom surface 6002 of the recessed portion 60 is made of a material having a low coefficient of friction. As an example, POM can be used as this material. Use of the washer 64 reduces the frictional resistance between the frame 24 and the biasing members 42 to smoothen and stabilize rotary motion of the frame 24. The second washer 66 placed over the first washer 64 prevents the first washer 64 from being damaged by the biasing members 42. The second washer 66 is made of a metal material.

The cylindrical member 54 has an annular plate portion 68 and a barrel part 70.

The annular plate portion 68 is centrally provided with a fitting hole 6802 in which the upper-end shaft portion 50 of the pivot 38 is inserted. As a result, the cylindrical member 54 is coupled to the pivot 38 non-rotatably but axially movably. The annular plate portion 68 is located opposite to the bottom surface 6002 of the recessed portion 60 and to the flange 48.

The surface of the flange 48 that faces the annular plate portion 68 is provided with a recessed groove 4802. A resilient member 72 is mounted in the groove 4802 to prevent the cylindrical member 54 from rattling in the axial direction. In the present embodiment, a wave washer is used as the resilient member 72.

The barrel part 70 covers the pivot 38, biasing members 42, and flange 48 over the bottom surface 6002. The barrel part 70 has an inside diameter larger than that of the flange 48 and an outside diameter smaller than that of the inner surface 6004. The barrel part 70 extends axially of the pivot 38 and is located inside the recessed portion 60. The lower end 7002 of the barrel part 70 is so disposed that it can abut against the washer 64.

In the present embodiment, the manipulating member 56 for locking is connected to the pivot 38 via the male thread 74 and a washer 76.

In the present embodiment, the manipulating member 56 for locking has a cylindrical wall 5602 for manipulation for rotation and a finger-caught portion 5604 mounted in the cylindrical wall 5602.

The stem portion of the male thread 74 passes through the fitting hole 6802 formed in the cylindrical member 54 and is in threaded engagement with the second female thread 3804 of the pivot 38.

The head of the male thread 74 is located over the recessed portion 60. The head of the male thread 74 and the locking manipulating member 56 are coupled together by a screw 78 so as to rotate as a unit. The cylindrical wall 5602 is provided with a hole 5602A through which the screw 78 and a tool for tightening the screw 78 are passed.

The washer 76 is mounted between the lower end of the cylindrical wall 5602 of the locking manipulating member 56 and the annular plate portion 68. The washer 76 is made of a material having a low coefficient of friction. For example, POM can be used as this material. Use of the washer 76 reduces the frictional resistance between the locking manipulating member 56 and the cylindrical member 54, thus smoothening and stabilizing rotary manipulation of the locking manipulating member 56.

A shaft 6804 protruding from the annular plate portion 68 is inserted in a groove 5612 formed in the manipulating member 56 for locking. Abutment of the shaft 6804 against the end of the groove 5612 determines the critical position in the direction to loosen the locking manipulating member 56.

The shaft 6804 is made to protrude from the flange 48 by mounting the shaft 6804 with a press fit. The cylindrical member 54 may be coupled to the pivot 38 such that it can move axially of the pivot 38 but cannot rotate, by inserting the shaft 6804 into a hole formed in the annular plate portion 68. In this case, the upper-end shaft portion 50 is shaped cylindrically. The fitting hole 6802 in the center of the annular plate portion 68 is a circular hole into which the upper-end shaft portion 50 is inserted so as to be movable axially.

Accordingly, in FIG. 8, if the manipulating member 56 for locking is rotationally manipulated in the direction of rotation in which the male thread 74 is brought into threaded engagement with the second female thread 3804, the manipulating member 56 for locking rotates toward the detachable plate 36 while following the threaded movement of the male thread 74 into the second female thread 3804. The manipulating member moves the cylindrical member 54 toward the detachable plate 36 via the washer 76 and annular plate portion 68. At this time, the resilient member 72 is compressed. As shown in FIG. 9, movement of the cylindrical member 54 brings the lower end 7002 of the barrel part 70 into abutment with the bottom surface 6002 of the recessed portion 60 via the washer 64. The portion of the frame 24 forming the bottom surface 6002 of the recessed portion 60 is held between the cylindrical member 54 and the detachable plate 36 while the spacer 62 and washer 64 are interposed. The frame 24 is non-rotatably supported over the case 18 of the camera body 12. That is, rotation of the frame 24 (viewfinder unit 14) is locked.

Under this condition, if the manipulating member 56 for locking is rotationally manipulated in the direction to bring the male thread 74 out of threaded engagement with the second female thread 3804, the manipulating member 56 for locking rotates away from the detachable plate 36. The cylindrical member 54 is moved away from the detachable plate 36 by the resilience of the resilient member 72. As shown in FIG. 8, the lower end 7002 of the barrel part 70 leaves the bottom surface 6002 of the recessed portion 60. Consequently, rotation of the frame 24 is maintained with given frictional resistance by the frictional mechanism 33. That is, rotation of the frame 24 (viewfinder unit 14) is unlocked.

The present embodiment yields the following advantages. Where rotation of the frame 24 is locked by the lock mechanism 34, even if the imaging apparatus 10 mounted to the pan head 2A of the tripod 2 is panned at a high speed as shown in FIG. 1, the viewfinder unit 14 is prevented from being inadvertently rotated due to inertia. Consequently, it may not be necessary for the photographer to modify the posture of the viewfinder unit 14 in a laborious manner. Hence, it is advantageous in enhancing convenience in use in cases where the imaging apparatus 10 might be quickly panned.

Furthermore, where rotation of the frame 24 is unlocked by the lock mechanism 34, the viewfinder unit 14 is rotatably supported on the detachable plate 36 with given frictional force via the revolving mechanism 32 and frictional mechanism 33 and so the viewfinder unit 14 can be easily rotated manually and placed into a desired rotational position. Since the frame 24 can be held to a desired rotational position by the frictional mechanism 33 without rotating the frame 24 idly, the photographer can easily vary the posture of the viewfinder unit 14 in response to shooting situations and variations in the posture of the imaging apparatus 10. This is advantageous in enhancing convenience in use.

Additionally, rotation of the frame 24 can be locked and unlocked by performing a quite simple manipulation of rotating the manipulating member 56 for locking. Therefore, rotation of the viewfinder unit 14 can be quickly switched between locked state and unlocked state according to shooting situations. This is advantageous in enhancing convenience in use.

In the description of the present embodiment, the lock mechanism 34 is applied to the revolving mechanism 32 for the frame 24 of the viewfinder unit 14. The lock mechanism according to one embodiment of the present invention can be widely applied to frame-revolving mechanisms of various devices and apparatus other than the viewfinder unit 14.

In addition, in the description of the present embodiment, the revolving mechanism 32 rotates the frame 24 about the vertical axis. The frame 24 can be rotated about an axis extending in any arbitrary direction.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   a camera body including a case, an imaging device accommodated in the case and acting to image a subject, and a signal-processing portion accommodated in the case and acting to create a video signal based on an imaging signal created by the imaging device;
   a viewfinder unit including a display portion for displaying an image based on the video signal and a frame supporting the display portion;
   a revolving mechanism for revolving the frame, the revolving mechanism including a detachable plate detachably connected to a detachable portion of the case, a pivot protruding from the detachable plate, and a shaft-receiving hole which is formed in the frame and into which the pivot is rotatably inserted;
   a frictional mechanism for giving frictional resistance to the frame and maintaining rotation of the frame; and
   a lock mechanism for locking and unlocking rotation of the frame;
   wherein the lock mechanism includes
   a cylindrical member coupled to the pivot so as to be movable along an axial direction of the pivot and having a barrel part which covers the pivot over a part of the frame that is around the shaft-receiving hole, and
   a manipulating member for locking, the manipulating member being rotatably coupled to the pivot;
   wherein when the manipulating member is rotated in one direction, the manipulating member moves the cylindrical member toward the detachable plate and the part of the frame around the shaft-receiving hole is held between the front end of the barrel part and the detachable plate; and
   wherein when the manipulating member is rotated in the other direction, the manipulating member permits the cylindrical member to move away from the detachable plate.

2. An imaging apparatus as set forth in claim 1, wherein the frictional mechanism includes biasing members which are mounted between a front end of the pivot protruding from the shaft-receiving hole and the part of the frame around the shaft-receiving hole and which bias the part of the frame into abutment with the detachable plate, and wherein the barrel part covers the biasing members as well as the pivot over the part of the frame.

3. An imaging apparatus as set forth in claim 1, wherein
   a flange is mounted to a part of the pivot protruding from the shaft-receiving hole,
   the frictional mechanism includes biasing members which are mounted between the flange around the pivot and a part of the frame around the shaft-receiving hole opposite to the flange, the friction mechanisms biasing the part of the frame into abutment with the detachable plate, and
   the barrel part covers the biasing members as well as the pivot over the part of the frame.

4. An imaging apparatus as set forth in claim 1, wherein
   the frame has a first surface placed opposite to the detachable plate and a second surface facing away from the first surface,
   the second surface is provided with an open recessed portion about the shaft-receiving hole,
   the frictional mechanism is located within the recessed portion,
   the barrel part covers the frictional mechanism within the recessed portion, and the cylindrical member is coupled to the pivot so as to be movable axially of the pivot and having an annular plate portion which is placed opposite to a bottom portion of the recessed portion and which is connected to the barrel part, wherein the manipulating member for locking is rotated in one direction, whereby the cylindrical member is moved toward the detachable plate via the annular plate portion.

5. An imaging apparatus as set forth in claim 1, wherein
a flange is mounted in a part of the pivot protruding from the shaft-receiving hole,
the frictional mechanism includes biasing members which are mounted between the flange around the pivot and the part of the frame around the shaft-receiving hole opposite to the flange and which bias the part of the frame into abutment with the detachable plate,
the frame has a first surface placed opposite to the detachable plate and a second surface facing away from the first surface,
the second surface is provided with an open recessed portion about the shaft-receiving hole,
the flange and the biasing members are located within the recessed portion,
the barrel part covers the flange and the biasing members within the recessed portion,
the cylindrical member is coupled to the pivot so as to be movable axially of the pivot, the cylindrical member having an annular plate portion which is placed opposite to the flange and which is connected to the barrel part, and
the cylindrical member is moved toward the detachable plate via the annular plate portion by rotating the manipulating member for locking in one direction.

6. An imaging apparatus as set forth in claim 1, wherein
a female thread is formed in a part of the pivot protruding from the shaft-receiving hole,
the manipulating member for locking has a male thread brought into threaded engagement with the female thread, and
the male thread is rotated relative to the female thread and the manipulating member for locking is moved axially of the pivot by rotation of the manipulating member for locking.

7. An imaging apparatus as set forth in claim 1, wherein the cylindrical member is non-rotatably coupled to the pivot.

8. An imaging apparatus as set forth in claim 1, wherein
a flange is mounted to a part of the pivot protruding from the shaft-receiving hole,
the frictional mechanism includes biasing members which are mounted between the flange around the pivot and a part of the frame around the shaft-receiving hole opposite to the flange and which bias the part of the frame into abutment with the detachable plate,
the frame has a first surface placed opposite to the detachable plate and a second surface facing away from the first surface,
the second surface is provided with an open recessed portion about the shaft-receiving hole,
the flange and the biasing members are located within the recessed portion,
the barrel part covers the flange and the biasing members within the recessed portion,
the cylindrical member is non-rotatably coupled to the pivot so as to be movable axially of the pivot, the cylindrical member having an annular plate portion which is placed opposite to the flange and which is connected to the barrel part,
the cylindrical member is moved toward the detachable plate via the annular plate portion by rotating the manipulating member for locking in one direction, and
a resilient member is mounted between the annular plate portion and the flange to bias the annular portion and the flange away from each other.

9. An imaging apparatus as set forth in claim 8, wherein the resilient member is a wave washer.

10. An imaging apparatus as set forth in claim 1, wherein the frame has a first surface placed opposite to the detachable plate and a second surface facing away from the first surface, and wherein a spacer is interposed between the first surface and the detachable plate.

11. An imaging apparatus as set forth in claim 10, wherein the spacer is made of a material having a coefficient of friction equal to that of polyacetal.

12. An imaging apparatus as set forth in claim 1, wherein
the frictional mechanism includes biasing members which are mounted between a front end of the pivot around the pivot and a part of the frame around the shaft-receiving hole and which bias the part of the frame into abutment with the detachable plate,
the frame has a first surface placed opposite to the detachable plate and a second surface facing away from the first surface, and
washers are interposed among the second surface, the biasing members, and the front end of the barrel part.

13. An imaging apparatus as set forth in claim 12, wherein the washer is made of a material having a coefficient of friction equal to that of polyacetal.

14. An imaging apparatus as set forth in claim 1, wherein
the frame has a first surface placed opposite to the detachable plate and a second surface facing away from the first surface,
a first washer is interposed between the second surface and the front end of the barrel part, and
a second washer is interposed between the biasing members and the first washer.

15. An imaging apparatus as set forth in claim 14, wherein the first washer is made of a material having a coefficient of friction equal to that of polyacetal, and wherein the second washer is made of a metal material.

16. An imaging apparatus as set forth in claim 1, wherein the manipulating member for locking has a surface facing the cylindrical member, and wherein a third washer is interposed between this surface and the cylindrical member.

17. An imaging apparatus as set forth in claim 16, wherein the third washer is made of a material having a coefficient of friction equal to that of polyacetal.

* * * * *